United States Patent [19]
Robbins et al.

[11] Patent Number: 5,220,602
[45] Date of Patent: Jun. 15, 1993

[54] NICAM COMPATIBLE TELEVISION SIGNAL CONVERTER

[75] Inventors: Clyde Robbins, Maple Glen; Leonard Taupier, Hatboro, both of Pa.

[73] Assignee: General Instrument Corporation, Hatboro, Pa.

[21] Appl. No.: 805,192

[22] Filed: Dec. 9, 1991

[51] Int. Cl.⁵ .............................................. H04N 7/167
[52] U.S. Cl. ........................................ 380/20; 380/10; 380/19; 358/196; 381/31
[58] Field of Search ............................. 380/10, 20, 19; 358/196; 381/31

[56] References Cited

U.S. PATENT DOCUMENTS

| | | | |
|---|---|---|---|
| 4,922,537 | 5/1990 | Frederiksen | 381/31 |
| 4,937,866 | 6/1990 | Crowther et al. | 380/20 |
| 5,138,457 | 8/1992 | Sakai et al. | 358/196 |

Primary Examiner—David Cain
Attorney, Agent, or Firm—Barry R. Lipsitz

[57] ABSTRACT

A NICAM compatible baseband television signal converter is provided. A television signal including a NICAM digital audio subcarrier is converted to baseband and the NICAM subcarrier is filtered therefrom. The video and analog audio portions of the baseband television signal are demodulated. The demodulated video is descrambled and the demodulated analog audio is descrambled and/or volume controlled. The demodulated video and analog audio signals are then remodulated onto respective video and analog carriers. The filtered NICAM digital audio subcarrier is mixed with the video carrier to provide a modulated NICAM carrier. The remodulated video and analog audio signals are combined with the modulated NICAM carrier for output to a video appliance such as a television or video recorder.

15 Claims, 1 Drawing Sheet

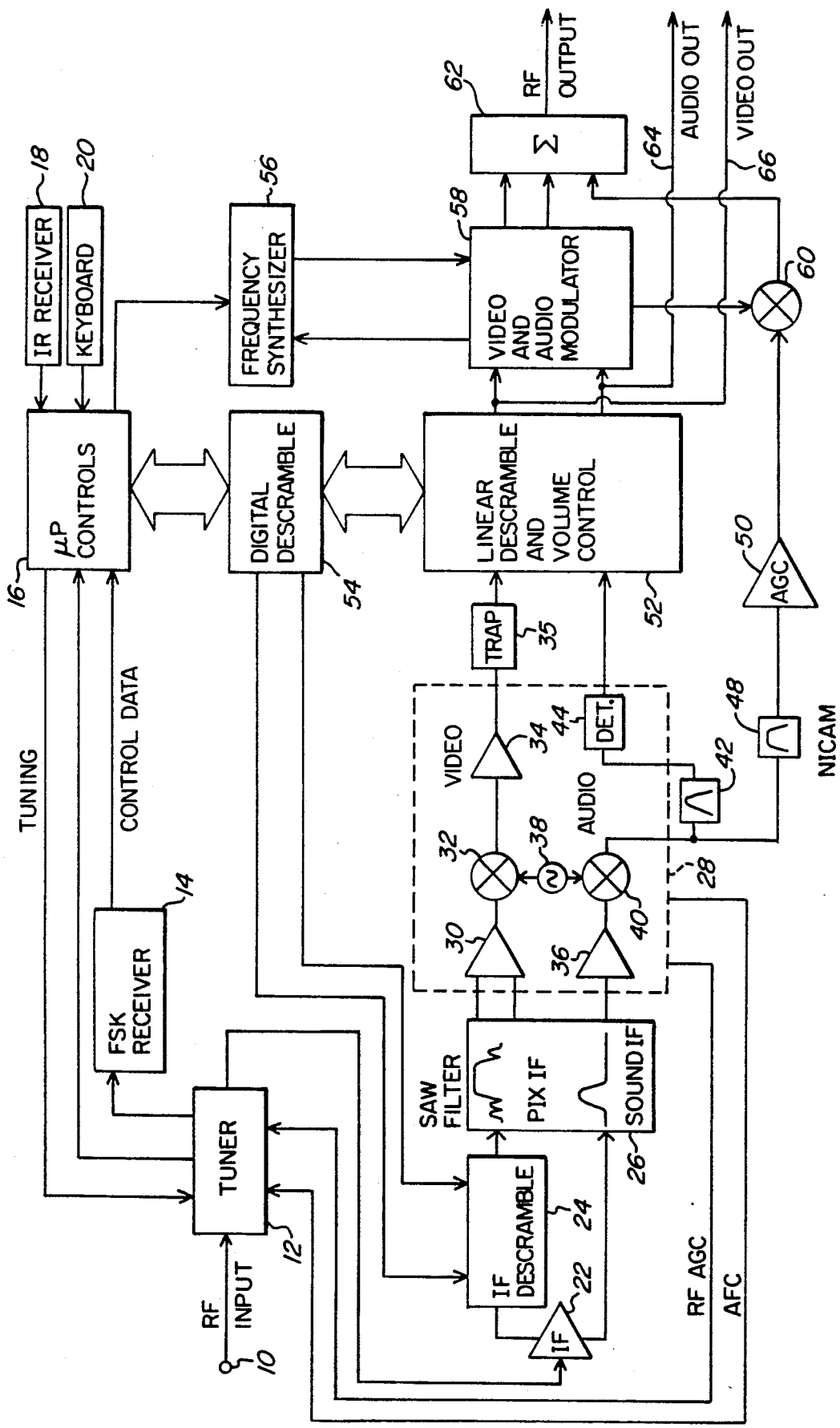

NICAM COMPATIBLE TELEVISION SIGNAL CONVERTER

BACKGROUND OF THE INVENTION

The present invention relates to cable television systems or the like, and more particularly to a set top converter that is compatible with both analog monaural and NICAM digital stereo audio.

The NICAM audio system uses two audio carriers. One of the carriers contains an FM modulated analog monaural audio signal. The other is a QPSK (quadrature phase shift keyed) carrier containing a compressed digital stereo audio signal. As an example, the analog FM sound carrier frequency can be 5.5 MHz, with the digital sound carrier at 5.85 MHz. In another example, the analog and digital sound carriers can reside at 6.0 MHz and 6.552 MHz, respectively. A specification describing the NICAM system in detail can be found in EBU Technical Recommendation SPB 424, Revised Version, "Digital Sound Transmission in Terrestrial Television," European Broadcasting Union, Brussels, Belgium, Apr. 1987.

The broadcasting of FM radio signals over cable television networks has never achieved significant success due to poor signal quality and the difficulty in collecting revenue by controlling access to the service. New digital techniques for the reproduction of sound provide performance that is far superior to analog techniques which have been used in the past. An example of high fidelity sound reproduction using digital techniques can be found in the compact disc technology which has recently enjoyed tremendous success as an alternative to phonograph records and tapes. Digital recording and playback techniques provide reproduction of music that is extremely realistic and free from background noise and distortions that have plagued other high fidelity sound reproduction systems currently in wide scale use.

In the United States, the Broadcast Television Systems Committee (BTSC) of the Electronic Industries Association has selected a television stereo audio system to serve as the standard for broadcast television. The format selected consists of a multiple subcarrier scheme developed by the Zenith Electronics Corporation and a noise reduction companding system developed by the DBX Corporation. A completely different system, known as NICAM, has been adopted for the transmission of stereo television sound in various countries outside of the United States. As noted above, the NICAM audio system uses two separate carriers for the original FM modulated analog monaural audio and the compressed digital stereo audio.

Cable television system operators in countries using the NICAM transmission format desire to provide NICAM digital stereo audio services to their customers. Typically, such cable systems transmit signals to a subscriber's television or other video appliance via a set top coverter that is connected between the cable drop and the receiving appliance. Baseband processing is advantageous in a cable television converter because it allows for enhanced scrambling of both audio and video signals. Baseband processing also enables the provision of volume control through the set top converter. The complexity of the NICAM signal, however, renders it prohibitively expensive to demodulate, volume control, and then remodulate in a baseband converter. Therefore, it would be advantageous to provide a baseband converter that is compatible with the NICAM audio system. Such a converter should enable the use of enhanced scrambling techniques available via baseband processing. The ability to adjust an audio signal's volume should also be provided via the converter.

The present invention provides a NICAM compatible converter having the aforementioned advantages.

SUMMARY OF THE INVENTION

In accordance with the present invention, a NICAM compatible television signal converter is provided. Tuner means select one of a plurality of television input signals containing a video portion, an analog audio portion, and a NICAM digital audio portion. Video demodulator means demodulate the video portion of a television signal selected by the tuner means. Audio demodulator means demodulate the analog audio portion of the selected television signal. NICAM intercarrier filter means are provided for recovering the NICAM digital audio portion of the selected television signal. The demodulated video portion of the selected television signal is processed and remodulated onto a first carrier to produce a modulated video carrier. The demodulated analog audio portion is processed and remodulated onto a second carrier to produce a modulated audio carrier. Means are provided for mixing the recovered NICAM digital audio portion with one of the first and second carriers to produce a modulated NICAM carrier. The modulated video carrier, modulated audio carrier, and modulated NICAM carrier are combined for output to a video appliance, such as a television set or video recorder.

In an illustrated embodiment, the NICAM digital audio portion is mixed with a video carrier of the same frequency as the video carrier that is modulated with the video portion of the selected television signal. As a result, the NICAM signal is provided as an intercarrier in the television video signal at the RF output of the converter.

The audio and video demodulators provided in the converter can comprise a quasi-parallel synchronous demodulator. A local oscillator provides a mixing frequency. A first mixer mixes the mixing frequency with a video IF portion of the selected television signal for demodulation. A second mixer mixes the mixing frequency with analog audio IF and NICAM digital audio IF portions of the selected television signal. Filter means coupled to an output of the second mixer pass the analog audio portion to a detector. The NICAM intercarrier filter means receive the output of the second mixer and recover the NICAM digital audio portion therefrom.

The processing of the demodulated video portion prior to its remodulation onto the first carrier can comprise the descrambling of the demodulated video portion. Similarly, the means for processing the demodulated analog audio portion can comprise means for descrambling the demodulated analog audio portion of the selected television signal. The means for processing the demodulated analog audio portion can further comprise means for controlling the volume of the analog audio portion of the selected television signal.

A method in accordance with the present invention provides baseband processing of video portions and analog audio portions of a scrambled television signal carrying a NICAM digital audio subcarrier. The television signal is converted to baseband, and the NICAM digital audio subcarrier is filtered therefrom. The analog audio portion of the baseband television signal is then demodulated to baseband, and at least one of the baseband video and analog portions is descrambled. The baseband video and analog audio portions are remodulated after the descrambling step onto video and analog carriers, respectively. The filtered NICAM digital audio subcarrier is mixed with one of the video and analog carriers to provide a modulated NICAM carrier. The remodulated portions are combined with the modulated NICAM carrier for output to a video appliance. In an illustrated embodiment, the filtered NICAM digital audio subcarrier is mixed with the video carrier to produce the modulated NICAM carrier. The baseband processing also enables the volume of the analog audio portion to be controlled.

BRIEF DESCRIPTION OF THE DRAWING

The FIGURE is a block diagram of a NICAM compatible television signal converter in accordance with the present invention.

DETAILED DESCRIPTION OF THE INVENTION

The present invention provides a NICAM compatible television converter, for use in connection with a subscriber television system, such as a cable television network. The converter is illustrated in block diagram form in the FIGURE.

An RF input signal, such as from a cable television drop, is input to a tuner 12 via an input terminal 10. Tuner 12 can be a conventional low noise dual conversion tuner well known in the art. The signals input via terminal 10 comprise television channel signals within the cable television spectrum, currently in the range of 50 MHz to 550 MHz for most CATV systems. Tuner 12 outputs a selected television channel to an intermediate frequency (IF) preamplifier 22 at an intermediate frequency of, for example, 38.9 MHz. IF preamplifier 22 outputs the selected television channel signal to a SAW filter 26 via an IF descrambling circuit 24. The IF signal is also input directly to the SAW filter 26 from IF preamplifier 22. The IF descrambling circuit 24 operates in a conventional manner as a first descrambling stage for a scrambled video signal. SAW filter 26 operates in a conventional manner to separate the video signal portion (PIX IF) and the audio portions (SOUND IF) of the selected television signal.

The filter signals from SAW filter 26 are passed to a quasi-parallel synchronous demodulator 28. Such demodulators are commercially available in integrated circuit form, for example, as Mitsubishi part no. M51365SP. The filtered video signal is input to a first mixer 32 via a differential amplifier 30. First mixer 32 mixes the video signal with a local oscillator frequency from local oscillator 38 to convert the video signal to baseband for amplification in a video amplifier 34. A conventional sound trap (notch filter) 35 removes any portion of the audio missed by SAW filter 26 from the video signal output from video amplifier 34.

The audio signal from SAW filter 26 is input to a second mixer 40 via an amplifier 36. Second mixer 40 also receives the local oscillator signal from local oscillator 38 to convert the analog and digital audio portions of the selected television signal to their conventional intercarrier frequencies, e.g., 5.5 MHz and 5.85 MHz or 6.0 MHz and 6.552 MHz. At this point, the audio portions contain both the original FM modulated analog monaural audio and the NICAM compressed digital stereo audio.

In accordance with the present invention, the NICAM compressed digital stereo audio is filtered from the output of mixer 40 by a NICAM intercarrier filter 48. The NICAM audio signal passed by filter 48 is input to a conventional automatic gain control amplifier 50 which has its output connected to a mixer 60 that also receives a video carrier from a video and audio modulator circuit 58. As a result, the video carrier is modulated with the NICAM digital audio subcarrier to provide a modulated NICAM carrier for input to a summing circuit 62. As described in greater detail below, summing circuit 62 mixes the modulated NICAM carrier with a modulated video carrier containing the video portions of the selected television signal and a modulated audio carrier containing the analog monaural audio portions of the selected television signal.

An FM audio intercarrier filter 42 is provided external to quasi-parallel synchronous demodulator 28 to pass only the FM modulated analog monaural audio portion of the selected television signal to a conventional FM detector 44. Detector 44 demodulates the analog audio signal to baseband and inputs it to a linear descrambling and volume control circuit 52, that also receives the demodulated video signal from amplifier 34. The video and/or analog audio portions are descrambled in a conventional manner by circuit 52. The analog audio signal is also processed to control its volume in a conventional manner by circuit 52. Such a linear descrambling and volume control circuit is present in various commercially available baseband converters, for example, those manufactured and sold by the Jerrold Communications Division of General Instrument Corporation, Hatboro, Pa., U.S.A. Such commercially available converters also include a digital descrambling circuit 54 that provides digital descrambling of the baseband signal. As indicated in the FIGURE, the IF descrambling circuitry 24 is responsive to the digital descrambling circuitry 54 in a conventional manner.

A converter control microprocessor 16 is provided to manage the various converter subsystems. Microprocessor 16 receives user inputs from either an infrared receiver 18 or a keyboard 20 that is located on the converter. In this manner, a user can control tuner 12 to select a desired program signal. Other functions of the converter can also be controlled by the user via the IR receiver and/or keyboard 20. Control data provided by the cable television headend is received from tuner 12 by an FSK receiver 14 and used by microprocessor 16 for program access control and other features in a well known manner.

Microprocessor 16 also controls a frequency synthesizer 56 that provides video and audio modulator 58 with the necessary operating frequency to provide video and audio carriers for remodulation of the descrambled video signal and descrambled and/or volume controlled audio signal output from circuit 52. Video and audio modulator circuit 58 remodulates the descrambled video onto a video carrier. The descrambled and/or volume controlled audio is remodulated onto an audio carrier. The modulated video and audio carriers from circuit 58 and the modulated NICAM carrier from mixer 60 are combined in combiner 62 to provide a combined RF output for use by a video appliance such as a television or video recorder. Separate audio output and video output lines 64, 66 respectively are also provided for use by a video appliance having separate input terminals for unmodulated audio and video signals.

It should now be appreciated that the present invention provides a NICAM compatible converter in which baseband processing is provided for the video and analog audio signals. The converter avoids the expense that would be necessary to demodulate, volume control, and then remodulate the NICAM signal. To accomplish this, the converter of the present invention passes the NICAM signal around the demodulation stage as a quasi-parallel intercarrier to the modulator stage, where it is mixed with an unmodulated video carrier to produce a new intercarrier at the RF output frequency. The video is demodulated, descrambled, and remodulated. Similarly, the analog audio is demodulated, descrambled and/or volume controlled, and remodulated.

Although the invention has been described in connection with a preferred embodiment, those skilled in the art will appreciate that numerous adaptations and modifications may be made thereto without departing from the spirit and scope of the invention as set forth in the claims.

What is claimed is:

1. A television signal converter comprising:
    tuner means for selecting one of a plurality of television channel input signals containing a video portion, an analog audio portion, and a digital audio portion;
    video demodulator means for demodulating the video portion of a television signal selected by said tuner means;
    audio demodulator means for demodulating the analog audio portion of said selected television signal;
    intercarrier filter means for recovering said digital audio portion of said selected television signal;
    means for processing a demodulating the demodulated video portion onto a first carrier to produce a modulated video carrier;
    means for processing and demodulating the demodulated analog audio portion onto a second carrier to produce a modulated audio carrier;
    means for mixing the recovered digital audio portion with one of said first and second carriers to produce a modulated digital audio carrier; and
    means for combining said modulated video carrier, modulated audio carrier, and modulated digital audio carrier for output to a video appliance.

2. A converter in accordance with claim 1 wherein said mixing means mix the recovered digital audio portion with said first carrier to produce said modulated digital audio carrier.

3. A converter in accordance with claim 1 wherein said audio and video demodulators comprise a quasi-parallel synchronous demodulator having:
    a local oscillator for providing a mixing frequency;
    a first mixer for mixing said mixing frequency with a video IF portion of said selected television signal to recover baseband video;
    a second mixer for mixing said mixing frequency with analog audio and digital audio IF portions of said selected television signal;
    filter means coupled to an output of said second mixer for passing said analog audio portion to a detector to recover baseband audio; and
    means for coupling said second mixer output to said intercarrier filter means for recovering sad digital audio portion.

4. A converter in accordance with claim 1 wherein said means for processing and remodulating the demodulated video portion comprise:
    means for descrambling the demodulated video portion of said selected television signal.

5. A converter in accordance with claim 4 wherein said means for processing and remodulating the demodulated analog audio portion comprise:
    means for descrambling the demodulated analog audio portion of said selected television signal.

6. A converter in accordance with claim 5 wherein said means for processing and remodulating the demodulated analog audio portion further comprise:
    means for controlling the volume of the analog audio portion of said selected television signal.

7. A converter in accordance with claim 4 wherein said means for processing and remodulating the demodulated analog audio portion comprise:
    means for controlling the volume of the analog audio portion of said selected television signal.

8. A converter in accordance with claim 1 wherein said means for processing and remodulating the demodulated analog audio portion comprise:
    means for descrambling the demodulated analog audio portion of said selected television signal.

9. A converter in accordance with claim 8 wherein said means for processing and remodulating the demodulated analog audio portion further comprise:
    means for controlling the volume of the analog audio portion of said selected television signal.

10. A converter in accordance with claim 1 wherein said means for processing and remodulating the demodulated analog audio portion comprise:
    means for controlling the volume of the analog audio portion of said selected television signal.

11. A method for baseband processing of video portions and analog audio portions of a scrambled television signal carrying a digital audio subcarrier, comprising the steps of:
    filtering said digital audio subcarrier from said television signal;
    demodulating the video and analog audio portion of said television signal to recover baseband video and baseband analog audio;
    descrambling at least one of said baseband video and baseband analog audio;
    remodulating said baseband video and analog audio after said descrambling step onto video and analog carriers respectively;
    mixing said filtered digital audio subcarrier with one of said video and analog carriers to provide a modulated digital audio carrier; and
    combining said remodulated video and analog audio with said modulated digital audio carrier for output to a video appliance.

12. A method in accordance with claim 11 wherein said filtered digital audio subcarrier is mixed with said video carrier to provide said modulated digital audio carrier.

13. A method in accordance with claim 11 comprising the further step of controlling the volume of said demodulated analog audio.

14. A method in accordance with claim 11 wherein said digital audio subcarrier is a NICAM digital audio subcarrier.

15. A NICAM compatible television signal converter in accordance with claim 1 wherein said digital audio portion is a NICAM digital audio portion.

* * * * *

UNITED STATES PATENT AND TRADEMARK OFFICE
CERTIFICATE OF CORRECTION

PATENT NO. : 5,220,602
DATED : June 15, 1993
INVENTOR(S) : Robbins, et al.

It is certified that error appears in the above-identified patent and that said Letters Patent is hereby corrected as shown below:

In Column 5:
In claim 1, line 13, "a demodulating" should read -- and remodulating -- .

In claim 1, line 16, "demodulating" should read -- remodulating -- .

In claim 3, line 15, "sad" should read -- said -- .

Signed and Sealed this

Twenty-fifth Day of January, 1994

Attest:

BRUCE LEHMAN

*Attesting Officer*  *Commissioner of Patents and Trademarks*